UNITED STATES PATENT OFFICE.

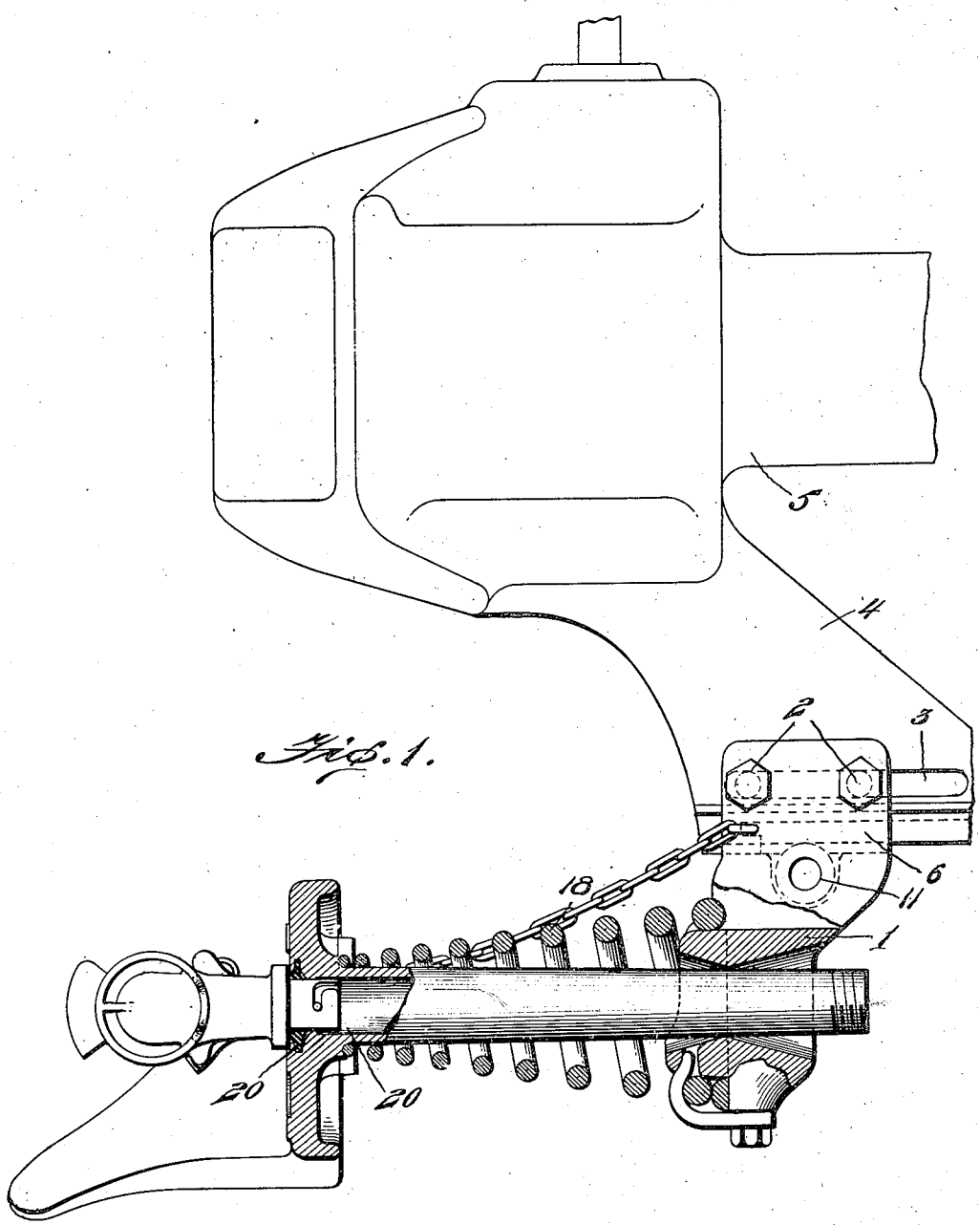

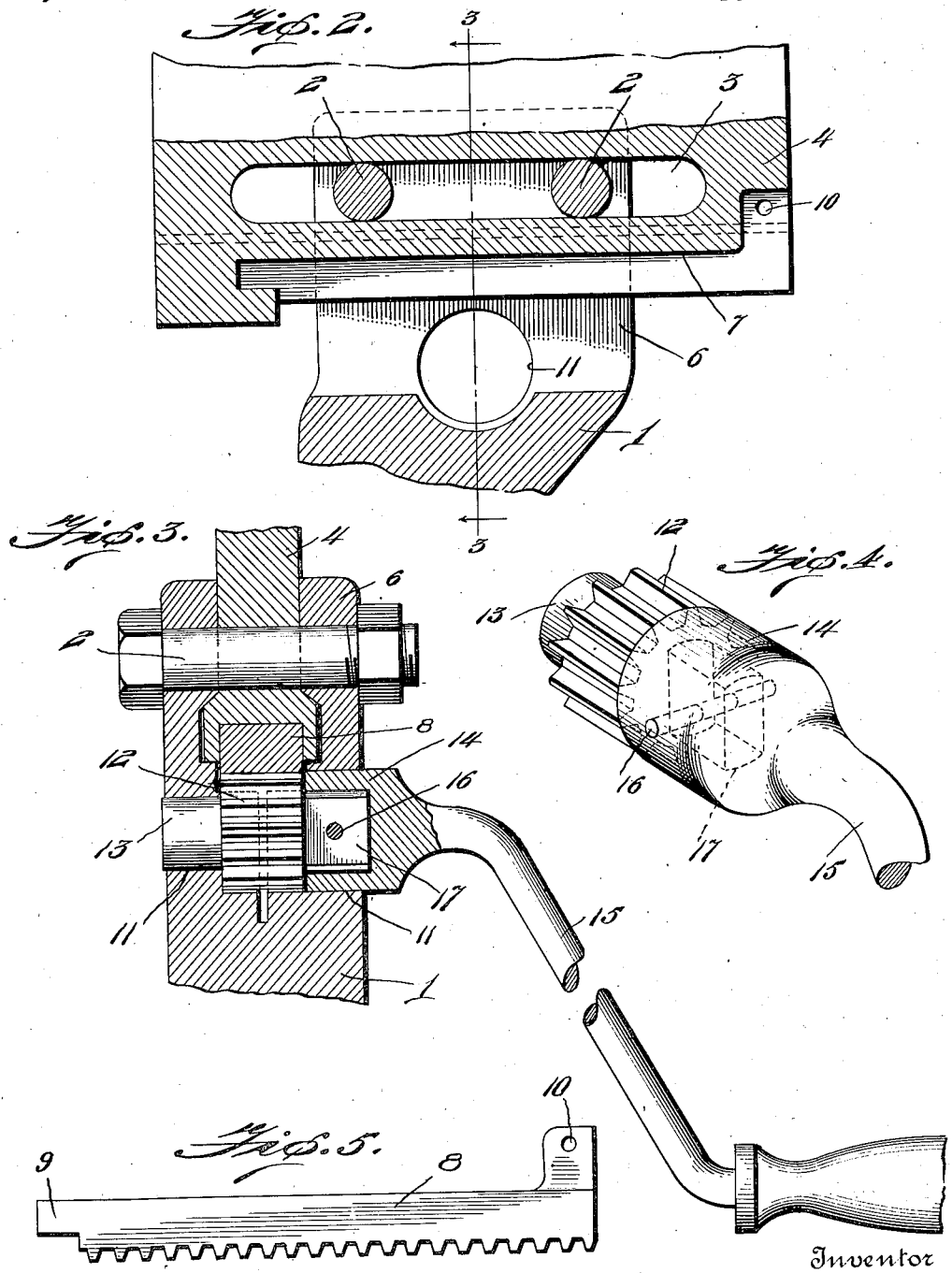

JOSEPH V. ROBINSON, OF BRANFORD, CONNECTICUT.

AUTOMATIC TRAIN-PIPE CONNECTOR.

1,245,775.      Specification of Letters Patent.      Patented Nov. 6, 1917.

Application filed October 28, 1911, Serial No. 657,250. Renewed March 21, 1917. Serial No. 156,458.

*To all whom it may concern:*

Be it known that I, JOSEPH V. ROBINSON, a citizen of the United States, and resident of Branford, in the county of New Haven and State of Connecticut, have invented certain new and useful Improvements in Automatic Train-Pipe Connectors, of which the following is a specification.

My invention relates to automatic train pipe connectors and has for its object to provide an improved means for renewing defective gaskets between the faces of coupled connector heads by shifting such heads from coupled engagement without first uncoupling the cars.

The invention consists in the combinations, constructions and improvements hereinafter described, pointed out in the appended claims and illustrated in the accompanying drawings in which similar reference symbols indicate corresponding parts in the several views:

Figure 1, is a vertical axial section with parts in section, illustrating one embodiment of my invention.

Fig. 2, is a central longitudinal section of the bracket and connector support shown in Fig. 1.

Fig. 3, is a section on the line 3—3 of Fig. 2 with the rack and pinion of the actuating mechanism inserted in operative position therein.

Fig. 4, is a perspective view of the actuating mechanism shown in Fig. 3, and

Fig. 5, is a side elevation of the rack shown in Fig. 3.

Referring to the drawings: 1 indicates a support adjustably mounted, as by bolts 2, and a slot 3, on a bracket 4 carried by any usual draw-bar 5; the support 1 being provided with clamping jaws 6, whereby it can be securely clamped in its several adjusted positions on the bracket 4.

The bracket 4 is shown provided with a seat or bearing 7, for removably supporting a rack 8; said rack being detachably secured in position by a lug 9 engaging an undercut portion of said seat, and by a pin extending through registering holes 10 in said rack and bracket.

The support 1 is provided with bearings 11 for removably supporting a pinion 12 in mesh with the rack 8; said pinion being provided with a reduced journal 13, and a large journal 14, for permitting ready insertion and removal of said pinion from the bearings 11. The large journal 14 preferably constitutes the socket of an operating crank 15, which is rigidly secured, as by a pin 16, to a lug 17 on the pinion.

From the above description, it will be clear that by placing the actuating mechanism 8 and 12 in position, and loosening the clamping bolts 2, the support 1 can be shifted by said mechanism to retract the connector from operative engagement with the connector of the adjacent car in a train, and to return the connector to such engagement and compress the connector spring 18 sufficiently to provide the required connecting tension on said connector; thereby permitting convenient inspection and repair of the connectors without uncoupling the cars of a train.

This provides an improved construction, in which a single common actuating mechanism can be interchangeably used with all the connectors of a series; thereby constituting a strong and inexpensive construction having a minimum of parts.

Having thus described my said invention, what I claim as new and desire to secure by United States Letters Patent is:

1. In a train pipe connector provided with a head, the combination of a bracket, a support for said head adjustably mounted on said bracket, and actuating mechanism, and means for removably supporting said mechanism in position for adjusting said support on said bracket.

2. In a train pipe connector provided with a head, the combination of a bracket, a support for said head adjustably mounted on said bracket, bearings on said bracket and support, and actuating mechanism adapted to be removably seated in said bearings for adjusting said support on said bracket.

3. In a train pipe connector provided with a head, the combination of a bracket, a support for said head adjustably mounted on said bracket, bearings on said bracket and support, and a rack and pinion adapted to be removably supported in said bearings for adjusting said support on said bracket.

4. The combination with a plurality of train pipe connectors comprising relatively adjustable brackets and supports, and connector heads carried thereby, of a common actuating mechanism, and means for removably supporting said mechanism in position for relatively adjusting said brackets and supports of the several train pipe connectors.

In testimony whereof I affix my signature in presence of two witnesses.

JOSEPH V. ROBINSON.

Witnesses:
G. AYRES,
C. A. BAKER.